United States Patent Office 3,052,549
Patented Sept. 4, 1962

3,052,549
CHEMICALLY LEAVENED BAKING COMPOSITION AND METHOD FOR PRODUCING THE SAME
Thomas P. Kichline, Chesterfield, and James L. Vetter, St. Louis, Mo., assignors to Monsanto Chemical Company, St. Louis, Mo., a corporation of Delaware
No Drawing. Filed Aug. 8, 1960, Ser. No. 47,950
22 Claims. (Cl. 99—95)

This invention relates to novel chemical leavening systems for baking compositions to novel baking compositions, and to methods for their application. More specifically, the invention relates to chemical leavening compositions and chemically leavened systems containing alkali metal acid pyrophosphate, and also to methods for enhancing the storage stability of baking compositions containing alkali metal acid pyrophosphate.

Most leavening systems heretofore known and described in the prior art cannot be used in baking compositions which are frozen and then stored for an extended period of time before they are baked because they quickly lose their ability to leaven, even when they are stored at extremely low temperatures. Because of the short shelf life of frozen unbaked muffins, biscuits, bread, etc., it has been impractical for many manufacturers of frozen baking goods to offer this type of goods for sale.

Among the leavened systems which were unstable in this respect prior to this invention are those containing leavening acids derived from phosphorus, such as alkaline earth ortho and pyrophosphates, alkali metal acid ortho and pyrophosphates, etc. Biscuit doughs containing sodium acid pyrophosphate, for example, can normally be stored at 20° F. for no longer than about 9 days without losing an undesirably large proportion of their ability to "rise" when baked.

It is a primary object of this invention to provide stabilized chemically leavened baking compositions which can be stored at freezing temperatures for an extended period of time without losing a major portion of their leavening character.

It is another object of this invention to provide chemical leavening compositions containing alkali metal acid pyrophosphate and having improved delayed leavening action.

It is still another object of the invention to provide a simple, convenient and economical method for producing stabilized chemically leavened baking compositions containing alkali metal acid pyrophosphate.

The above as well as other objects of the invention are achieved by including in the baking compositions containing alkali metal acid pyrophosphate small amounts of (1) a material which furnishes calcium ions when it is dissolved in water and (2) a water-soluble alkali metal polyphosphate having a chain length greater than about 8.

The actual mechanisms of the reactions involved by this invention are not known. However, the observed net effect is that the rate of reaction of the leavening acid (the alkali metal acid pyrophosphate) with the baking carbonate is substantially reduced.

It is believed to be very surprising that the combination of alkali metal acid pyrophosphate and calcium ions, plus the longer chain polyphosphate, yields a slower-reacting composition than does the combination of alkali metal acid pyrophosphate and calcium ions in the absence of the longer chain polyphosphate.

It is surprising because calcium ions are known to slow down the leavening reaction rate of alkali metal acid pyrophosphate. If one adds a water-soluble alkali metal polyphosphate to a leavening system containing alkali metal acid pyrophosphate and calcium ions, he would expect the leavening reaction rate to increase, since polyphosphates are known to react with and tie up calcium ions. Contrary to all expectations, however, it was found that the addition of water-soluble longer chain alkali metal polyphosphates to baking compositions containing alkali metal acid pyrophosphate and calcium ions results in a substantially slower leavening reaction rate than is usually possible by the addition of calcium ions alone to these leavening systems. The actual relationships between particular polyphosphates and their ability to demonstrate this remarkable effect will be discussed in greater detail below.

Chemically leavened compositions such as the dough or batter for cakes, biscuits, etc., contain as essential ingredients an acid-reacting material and a material which releases carbon dioxide gas when it reacts with the acid-reacting material. Acid-reacting materials customarily used in baking compositions are alum, tartaric acid or its acid salts, and acid salts of phosphoric acid, pyrophosphoric acid, or combinations of these materials. Normally sodium bicarbonate or sodium carbonate are used to furnish the carbon dioxide gas, and are termed "baking carbonates." The preferred baking carbonate for use with the present invention is sodium bicarbonate, although potassium bicarbonate, for example, can be used.

The present invention is applicable to a large variety of baking compositions including, for example, doughs and batters for cakes, quick breads, muffins, biscuits, pancakes, waffles, and the like, which require the generation of carbon dioxide gas in order to "rise" when they are baked. Such compositions are intended herein to be encompassed by the term "chemically leavened baking compositions." This invention does not apply to baking compositions such as angel food cakes, etc., which do not normally utilize chemical leavening systems but which rather depend solely upon whipped-in air for their lightness.

It is also surprising that only alkali metal polyphosphates having chain lengths greater than about 8 can demonstrate the remarkable results of the present invention. Typical of the linearly polymeric phosphates suitable for use in the various aspects of the present invention are the alkali metal phosphate glasses, i.e., the amorphous compositions having $M_2O/P_2O_5$ molar ratios between 1 and about 1.4, where M is an alkali metal. As has been described in various literature references [see, for example, Van Wazer, J. R., Journal of the American Chemical Society, 72, pp. 644–647 and 647–655 (1950)], these phosphate glasses are mixtures of water-soluble, straight chain, polymeric materials made up of alternating atoms of oxygen and phosphorus. These mixtures of linearly polymeric phosphates can be characterized in terms of an average chain length, $\bar{n}$. The term "chain length," as applied to these straight chain polymeric phosphates, refers to the number of phosphorus atoms in the straight chain polymer.

As is also pointed out by Van Wazer, the average chain length of the mixture of polymers in, for example, a sodium phosphate glass is primarily a function of the ratio of $Na_2O/P_2O_5$ in the melt from which the glass was formed. The predominant polymer in such a mixture has a chain length equal to the whole number most closely approaching the value of the average chain length. The proportions of the other chain length polymers in the mixture become progressively smaller as the chain length increases or decreases from the average chain length. The average chain length of the glasses becomes increasingly greater as the ratio of $M_2O/P_2O_5$ decreases, ranging (for materials useful for the present invention) from an average chain length of about 8 when the $M_2O/P_2O_5$ ratio equals about 1.4 to a chain length of several thousands or more as the ratio of $M_2O/P_2O_5$ approaches unity.

The alkali metal moiety of said polyphosphate glasses is selected from the group consisting of sodium, potassium, lithium and ammonium. The ammonium radical is often classified with the alkali metals for many purposes, and is so classified in the present application.

As indicated previously, the phosphate polymers suitable for use according to the present invention are those which are linear, are water-soluble, and have a chain length greater than about 8. As the length of the chain increases above 8, the polymers become more effective for purposes of the present invention. Thus, phosphate polymers having a chain length of 12 are more effective than those having chain lengths between 8 and 11. Likewise phosphate polymers having a chain length of about 20 are more effective than those having chain lengths of less than 19, phosphate polymers having a chain length of about 50 are more effective than those having a chain length of 20 and so on. A preferred class of linearly polymeric alkali metal phosphates are those having an average chain length greater than about 12. While the effectiveness increases as the chain length increases, the rate of increase of effectiveness with respect to increase in chain length decreases as the chain length increases. Examples of particularly desirable linearly polymeric phosphates are the commercially available sodium phosphate glasses having molar ratios of $Na_2O/P_2O_5$ of from about 1 and about 1.4.

The foregoing discussion stresses the importance of some of the sodium phosphate glasses in the practice of the present invention because such glasses are well known and more widely available than some of the other alkali metal linear polyphosphate materials. However, it should be understood that any of the linear, water-soluble sodium, potassium, lithium or ammonium polyphosphates having a chain length greater than about 8 is suitable for the practice of the instant invention. Examples of other suitable materials are Kurrol's salt (a water-soluble, crystalline linearly polymeric potassium metaphosphate), lithium phosphates having a molar ratio of $Li_2O/P_2O_5$ between 1 and 1.4, linearly polymeric ammonium phosphates formed either by replacing true alkali metal ions with ammonium ions or by reaction of ammonia and $P_2O_5$ (with or without water), and the like.

Any material which furnishes calcium ions when it is dissolved in water can be employed in accordance with this invention (including water soluble calcium salts of inorganic acids, water-soluble calcium salts of organic acids and calcium hydroxide), provided certain obvious precautions are exercised in their use. For example, in baking compositions, it is rarely desirable to use toxic ingredients, or materials which tend to strongly affect pH, taste, smell, etc. of the baked goods. For example, calcium chloride can be used in the practice of the instant invention, provided an appropriate approximately neutral buffer such as sodium benzoate is used at the same time to maintain the baking composition at about neutrality. Examples of water-ionizable materials which contain calcium as one of their ions and which are relatively inexpensive and can be used in the practice of this invention without particular concern about buffers, taste, odor, etc., are calcium hydroxide, calcium sulfate, and calcium lactate.

The quantities of the various materials containing calcium ions which can be used according to this invention will be discussed below. However, note should be made that, while milk is a source of calcium ions which can be used, the improvement in storage stability of baking compositions in which milk has been used as one of the sources of calcium ions is usually not as marked as the improvement observed when calcium hydroxide and/or calcium sulfate, for example, is used as the source of calcium ions in the absence of milk. The reasons for this decrease in degree of effectiveness of leavener stabilization in the presence of milk are not known. But on the basis of the observed effects of milk on the stability of these chemically leavened baking compositions, it is preferred that the compositions be prepared in the absence of milk.

Since the presence of milk in many baking compositions is desired for a great many reasons, including improved flavor or texture, it will be necessary, in many instances, to practice this invention utilizing both milk and a calcium salt, such as calcium hydroxide, calcium chloride, calcium lactate, or calcium sulfate, etc. Therefore, when calculations are made to determine how much calcium ion is to be added to the baking composition in order to attain the improved stability according to the present invention, the calcium content of the milk which is added to the baking composition must be taken into account as part of the total calcium ion present in the final baking composition.

It is an advantage of the present invention that the stabilized baking compositions can be prepared in more than one way. For example, depending upon the particular procedure desired by the one who is practicing this invention, the alkali metal acid pyrophosphate, the longer chain polyphosphate, and the material which furnishes the calcium ions can be mixed together in any water which is to be used in the baking composition before the flour, salt, sugar, shortening, or other ingredients are combined with the water to produce the final dough or batter. Improvement in the storage stability of chemically leavened baking compositions containing alkali metal acid pyrophosphate can also be observed when the dry leavening ingredients are mixed into an otherwise already-prepared dough or batter. Still further improvement in the storage stability of these chemically leavened baking compositions can be accomplished when the alkali metal acid pyrophosphate, the longer chain polyphosphate, and the material which furnishes calcium ions, and the baking carbonate are intermixed with at least part of the remaining dry ingredients which are used in the baking composition (i.e. the flour, sugar, baking carbonate, salt and/or shortening), before the water or milk is added to make the final dough or batter. A particularly desirable embodiment of the present invention, therefore, is the dry chemical leavening composition ("baking powder") comprising a baking carbonate, an alkali metal acid pyrophosphate, a material which furnishes calcium ions when it is dissolved in water, and an alkali metal, water-soluble polyphosphate having a chain length greater than about 8. Such a composition can be mixed either with the otherwise already-prepared dough (containing substantially all of the ingredients of the baking composition except the leavening system) or with the dry ingredients before the water or milk is added, as has just been described. The approximate quantities of each ingredient which must be combined to yield a dry chemical leavening composition within the scope of the present invention will become apparent from the following discussion.

Generally, in the practice of the present invention, the quantities of alkali metal acid pyrophosphate which can be used in the various baking compositions contemplated can vary within reasonably wide limits.

For example, extremely stable compositions can be made containing between about 0.7% and about 4.2% alkali metal acid pyrophosphate, based on the weight of the flour in the baking composition. It is usually preferred, however, to utilize between about 1.4% and about 3.5% of the leavening acid.

The quantities of both the material which furnishes calcium ions and the alkali metal longer chain water-soluble polyphosphate are dependent to some extent upon the concentration of the alkali metal acid pyrophosphate in the baking composition. Therefore the following percentage figures are based upon the total weight of alkali metal acid pyrophosphate in the baking composition. Improved storage stability can be observed when the concentration of the water-soluble alkali metal polyphosphate is between about 0.7% and about 10%, but preferably between about 2% and about 7%, while the concentration of the material which can furnish calcium ions when it is dissolved in water can be in the range of from about 0.2% and about 3%, and preferably should be used at a concentration between about 0.5% and about 2% by weight (calculated as calcium ion) of the alkali metal acid pyrophosphate in the baking composition. Generally the presence of larger quantities or smaller quantities of calcium ions than those just described result in a speeding up of the leavening reaction in the baking composition and thereby defeat the purpose of the present invention.

The following table illustrates the wide variety of chemically leavened baking compositions to which the present invention is applicable.

| Ingredient | Percent Flour basis for— | | | | | | | |
|---|---|---|---|---|---|---|---|---|
| | Biscuits | Pancake | Waffle | Muffin | White Cake | Yellow Cake | Chocolate Cake | Quick Breads |
| Flour | 100 | 100 | 100 | 100 | 100 | 100 | 100 | 100 |
| Salt | 2.0 | 2.5 | 2.0 | 2.5 | 2.0 | 2.0 | 3.0 | 1.5 |
| Soda | 2.0 | 2.0 | 1.50 | 1.75 | 1.50 | 1.50 | 3.5 | 1.50 |
| SAPP | 2.7 | 2.7 | 2.03 | 2.37 | 2.03 | 2.03 | 2.03 | 2.03 |
| Polyphosphate | 0.135 | 0.135 | 0.101 | 0.118 | 0.101 | 0.101 | 0.101 | 0.101 |
| Ca(OH)$_2$ | 0.136 | 0.036 | 0.027 | 0.031 | 0.027 | 0.027 | 0.027 | 0.027 |
| Shortening | 15 | 10 | 15 | 20 | 33 | 40 | 60 | 7.5 |
| Milk | 6 | 2 | 6 | 6 | 10 | 5.0 | 7.5 | 6.0 |
| Corn Sugar | | 2.5 | 1.0 | | | | | |
| Sucrose | | | 2.0 | 5.0 | 100 | 107 | 150 | 50 |
| Dried Whole Egg | | | 5.0 | | | 11.0 | 15.0 | 3.8 |
| Soya Flour | | | | 7.5 | | | | |
| Dried Egg Yolk | | | | 4.0 | | | | |
| Dried Egg White | | | | | 3.0 | | | |
| Dutched Cocoa | | | | | | | 30 | |
| Water | 65 | 200 | 200 | 100 | 125 | 125 | 180 | 100 |

In the following series of examples, chosen to illustrate preferred embodiments of the present invention, tests relating to storage stability of frozen biscuit dough are described. These tests relate to the "specific volumes" of biscuits after they have been stored in the unbaked state for a period of time. The term "specific volume" is known in the art and is herein intended to mean the number ratio of cubic centimeters of baked biscuits per gram of unbaked biscuit dough. In this series of illustrations, frozen biscuits that exhibit a "specific volume," at least 2.00 after they are baked from the frozen state (from ⅜ inch thick by 2 inches in diameter cut unbaked biscuits) for 15 minutes at 450° F. are considered to be acceptable, while those that yield "specific volumes" of less than 2.00 are considered inferior and not acceptable. Storage stability of the frozen biscuits is rated in days of maximum storability. For example, in Example I below, the practice of the present invention makes it possible to store unbaked biscuits for at least 20 days at 20° F. before their "specific volumes" drop below 2.00, whereas unbaked biscuits prepared according to conventional procedures can be stored for only about 8 days before their "specific volumes" drop below 2.00. In other words, the "stability" of these unbaked biscuit batches can be stated in terms of 20 days and 8 days, respectively. For simplicity, "stability" in the following examples will be described in terms of the maximum number of days the compositions can be stored and still yield acceptable "specific volumes"—i.e. specific volumes greater than 2.00 cubic centimeters of baked biscuit per gram of biscuit dough (unbaked biscuit).

The invention will now be illustrated by the following specific examples in which all parts are by weight unless otherwise indicated:

EXAMPLE I

*Pre-Mixing Leaveners and Water*

To 600 mls. of water being stirred slowly in the bowl of a conventional electric mixer at room temperature are added gradually over about a 15 second period of time 0.33 gram of calcium hydroxide followed by 25 grams of sodium acid pyrophosphate. The slow agitation is continued for about one minute after all of the pyrophosphate is added. Then 1.25 grams of Graham's salt is added to the slurry containing calcium hydroxide and sodium acid pyrophosphate. To the resulting slurry is then added the remainder of the ingredients which are required in the preparation of biscuits:

| | Grams |
|---|---|
| Flour | 923 |
| Salt | 18.4 |
| Sodium bicarbonate | 18.4 |
| Shortening | 138 |

(The flour, salt, sodium bicarbonate, and shortening are previously intermixed.)

The stability at 20° F. of frozen biscuits prepared from this dough is 19 days. In the absence of the Graham's salt, the stability of biscuits which are otherwise similarly prepared is 10 days, while the stability of biscuits prepared similarly, but in the absence of both calcium ion and Graham's salt, is only 8 days.

EXAMPLE II

*Dry Leavener Added to Dough*

The following ingredients are first well blended with 600 mls. of water, using a conventional electric mixer:

| | Grams |
|---|---|
| Flour | 923 |
| Salt | 18.4 |
| Shortening | 138 |

Into this prepared dough are then mixed 44.6 grams of a blend of the following ingredients:

| | Parts |
|---|---|
| Sodium bicarbonate | 40 |
| Sodium acid pyrophosphate | 56 |
| Calcium sulfate | 1.76 |
| Potassium hexametaphosphate | 2.24 |

The resulting dough is rolled to a thickness of ⅜ inch, cut into 2-inch unbaked biscuits, quick frozen on Dry Ice, and stored at 10° F. The stability of these frozen biscuits is rated at about 20 days.

The stability at 20° F. of frozen biscuits prepared in a similar manner, except by replacing the potassium hexametaphosphate with Graham's salt is rated at 22 days. By comparison, the stability of frozen biscuits prepared in a similar manner, but in the absence of calcium sulfate and the longer chain polyphosphate is rated at only 8 days.

EXAMPLE III

*Dry Leavener Added to Other Dry Ingredients*

The following ingredients are well blended by stirring them slowly together for about 5 minutes in the bowl of a conventional electric mixer:

| | Grams |
|---|---|
| Flour | 923 |
| Salt | 18.4 |
| Sodium bicarbonate | 18.4 |
| Shortening | 138 |
| Sodium acid pyrophosphate | 25 |
| Calcium hydroxide | 0.60 |
| Sodium hexametaphosphate | 1.50 |

Then 700 mls. of water are added slowly over a period of about 2 minutes while the slow stirring is maintained. Thorough mixing is then accomplished by blending all of these ingredients at medium speed for about 5 minutes. Unbaked biscuits are then cut from the resulting dough in the usual fashion and frozen. The storage stability at 20° F. of the frozen biscuits prepared according to this procedure is rated at 23 days. Unbaked biscuits prepared similarly, but without the longer chain polyphosphate (sodium hexametaphosphate in this example) or calcium hydroxide have storage stabilities at 20° F. of only 9 days.

EXAMPLE IV

The following ingredients are first well blended with 600 mls. of water using a conventional electric mixer:

| | Grams |
|---|---|
| Flour | 923 |
| Salt | 18.4 |
| Shortening | 138 |

Into this prepared dough are the mixed 45 grams of a blend of the following ingredients:

| | Parts |
|---|---|
| Sodium bicarbonate | 40 |
| Ammonium acid pyrophosphate | 54 |
| Calcium sulfate | 3 |
| Graham's salt | 3 |

The stability of frozen biscuits prepared from this dough and stored at 0° F. is rated at 19 days.

While the above examples were, for simplicity, limited to the art of frozen dough preparation and storage, it should be understood that the very valuable benefits of leavener stabilization which can be derived from the practice of the present invention are applicable to all chemically leavened baking compositions containing alkali metal acid pyrophosphate as the chemical leavener. The leavener stabilizing effect of this invention in doughs and batters which are not frozen is characterized by a pronounced delayed leavener action. Here, again, the presence of both calcium ions and a water-soluble alkali metal polyphosphate (having a chain length greater than about 8) surprisingly yields a more pronounced delay in the leavening reaction than does the presence of calcium ions alone. The examples below illustrate this surprising delayed-action effect.

The delayed-action effect which can be derived by practicing the present invention will be readily recognized by those in the art as a very valuable and useful innovation. Whereas heretofore those who formulate baking compositions were largely limited as to the rates of chemical leavening of their products by the relatively few forms of chemical leavening acids then available, the present invention makes it possible, by properly selecting and balancing leavening acid, calcium ions, and longer chain alkali metal polyphosphate in the various baking compositions, to very closely select and control the particular rate of leavening desired.

One well known method for measuring the rates of reaction of leaveners is the Dough Rise Time Method (DRT). This method is, essentially, the measurement, under closely controlled conditions, of the amount of time which is required for 234 g. of dough to reach a volume of 285 milliliters. The DRT values in the following examples represent time, in minutes, for 234 grams of the doughs or batters described to reach a volume of 285 mls. (temperature equals 70° F.).

The following ingredients are blended for 4 minutes in a mixer.

| | Grams |
|---|---|
| Flour | 1000 |
| Salt | 20 |
| Sugar | 20 |
| Shortening | 100 |
| Sodium bicarbonate | 22.5 |
| Sodium acid pyrophosphate | 31 |
| Calcium hydroxide | 1.50 |
| Sodium polyphosphate (varying—see table below). | |

Water (620 parts) is then added over a period of 10 seconds. The mixer is stopped 45 seconds after the addition of water. The paddle is removed from the mixer and replaced by a dough hook. Then the ingredients are mixed for an additional 5 minutes. The rate of reaction (according to the DRT Method) given in the following table demonstrates that, while Graham's salt, (a water-soluable sodium polyphosphate having a chain length ($\bar{n}$) of about 50) can slow down the leavening rate of reaction of sodium acid pyrophosphate, sodium polyphosphates having chain lengths of less than 8 do not. Note that higher DRT numbers signify a reduction of the leavening rate of reaction, while lower DRT numbers signify an increase in the leavening rate of reaction.

EXAMPLE V

*Effect of Polyphosphate Chain Length and Concentration* [1]

[In minutes Tf DRT]

| Average Polyphosphate Chain Length ($\bar{n}$) | Polyphosphate Concentration (Percent) [2] | | | | | | |
|---|---|---|---|---|---|---|---|
| | 0 | 1 | 2 | 5 | 8 | 12 | 16 |
| 2 | 192 | 189 | 173 | 191 | 184 | 144 | 109 |
| 3 | 192 | 163 | 152 | 123 | 144 | 132 | 126 |
| 6 | 192 | 154 | 145 | 144 | 144 | 138 | 145 |
| 50 | 192 | 227 | 234 | 210 | 201 | 195 | 180 |

[1] 3% calcium, based on sodium acid pyrophosphate weight.
[2] Based on the weight of the sodium acid pyrophosphate in the formulation.

Alkali metal acid pyrophosphates having varying inherent leavening rates of reaction are known [Chemistry of Leavening, by John R. Van Wazer and Peter G. Arvan, Milling Production, February-March issue, pp. 3–7 (1954)]. It is a distinct advantage of the present invention that its important stabilizing benefits can be practiced on any of the various alkali metal acid pyrophosphates, including those having relatively faster reaction rates.

The following example demonstrates the remarkable stabilizing effects of the present invention on two relatively faster reacting sodium acid pyrophosphates.

EXAMPLE VI

*Effect of Graham's Salt Plus $CaSO_4$ on DRT of Relatively Faster-Acting Sodium Acid Pyrophosphate*

| | Very fast-acting Pyrophosphate | Fast-acting Pyrophosphate |
|---|---|---|
| No additives | 0 | 7 |
| With $CaSO_4$ and Graham's salt [1] | 24 | 195 |

[1] 6.12% $CaSO_4$ (1.8% Ca) and 5% Graham's salt ($\bar{n}=50$), both based on the weight of sodium acid pyrophosphate in the formulation.

From the above table it is apparent that with even very fast-acting sodium acid pyrophosphate the beneficial stabilizing effects of this invention can be developed. Whereas, conventionally, the rate of reaction of the very fast-acting sodium acid pyrophosphate is so high that the dough rises almost instantaneously, the presence of calcium ions and the longer chain polyphosphate according to the present invention results in a substantially lower rate of the leavening reaction.

EXAMPLE VII

*Effect of Graham's Salt and Calcium Salts on DRT*

| Calcium Salt | Percent Ca [1] | Without Graham's Salt | With 5% Graham's Salt [1] |
| --- | --- | --- | --- |
| $CaSO_4$ | 2.4 | 195 | 331 |
| $CaCl_2 \cdot 2H_2O$ | 2.4 | 200 | 251 |
| Calcium lactate | 2.4 | 190 | 247 |
| $Ca(OH)_2$ | 2.4 | 185 | 248 |
| $Ca(OH)_2$ | 1.2 | 150 | 220 |
| None | | 85 | |

[1] Based on the weight of sodium acid pyrophosphate in the formulation.

Example VII, above, illustrates the extended delay in the leavening reaction which can be developed in the practice of the present invention, illustrating the effect of using different sources of calcium ions.

Having thus described the invention and several specific embodiments thereof, the following is claimed:

What is claimed is:

1. A chemically leavened baking composition suitable for prolonged storage at temperatures below about 30° F., said composition comprising flour, water, shortening a water-ionizable material containing calcium as one of its ions, a baking carbonate, an alkali metal acid pyrophosphate, and a water-soluble alkali metal polyphosphate having a chain length greater than about 8.

2. A chemically leavened baking composition comprising flour, water, shortening, from about 0.7% to about 4.2% of an alkali metal acid pyrophosphate, based on the total weight of flour, from about 0.7% to about 10% of a water-soluble alkali metal polyphosphate having a chain length greater than about 8, and from about 0.2% to about 3% of a water-ionizable material containing calcium as one of its ions; said percentages of polyphosphate and material containing calcium being based on the total weight of alkali metal acid pyrophosphate present in the baking composition.

3. A chemically leavened baking composition comprising flour, water, shortening, from about 0.7% to about 4.2% of an alkali metal acid pyrophosphate, based on the total weight of flour, from about 0.7% to about 10% of a water-soluble alkali metal polyphosphate having a chain length greater than about 8, and from about 0.2% to about 3% of a non-toxic calcium salt of an inorganic acid; said percentages of polyphosphate and calcium salt being based on the total weight of alkali metal acid pyrophosphate present in the baking composition.

4. A chemically leavened baking composition comprising flour, water, shortening, from about 1.4% to about 3.5% of an alkali metal acid pyrophosphate, based on the total weight of flour, from about 2% to about 7% based on the total weight of alkali metal acid pyrophosphate, of a water-soluble alkali metal polyphosphate having a chain length greater than about 12, and from about 0.5% to about 2%, based on the total weight of alkali metal acid pyrophosphate, of a non-toxic calcium salt of an inorganic acid.

5. The composition of claim 4 wherein the alkali metal acid pyrophosphate is sodium acid pyrophosphate.

6. The composition of claim 4 wherein the alkali metal acid pyrophosphate is ammonium acid pyrophosphate.

7. The composition of claim 4 wherein the calcium salt is calcium chloride.

8. The composition of claim 4 wherein the calcium salt is calcium sulfate.

9. A chemically leavened baking composition comprising flour, water, shortening, from about 1.4% to about 3.5% of an alkali metal acid pyrophosphate, based on the total weight of flour, from about 2% to about 7% of a water-soluble alkali metal polyphosphate having a chain length greater than about 12, and from about 0.5% to about 2% of calcium hydroxide; said percentages of alkali metal polyphosphate and calcium hydroxide being based on the total weight of alkali metal acid pyrophosphate in the baking composition.

10. The composition of claim 5 wherein the water-soluble alkali metal polyphosphate is sodium hexametaphosphate.

11. The composition of claim 5 wherein the water-soluble alkali metal polyphosphate is Graham's salt.

12. A chemically leavened baking composition comprising flour, water, shortening, from about 1.4% to about 3.5%, based on the total weight of flour, of sodium acid pyrophosphate, from about 2% to about 7%, based on the total weight of sodium acid pyrophosphate, of a water-soluble alkali metal polyphosphate having a chain length greater than about 12, and from about 0.5% to about 2%, based on the total weight of sodium acid pyrophosphate, of calcium lactate.

13. The composition of claim 12 wherein the alkali metal polyphosphate is sodium hexametaphosphate.

14. The composition of claim 12 wherein the alkali metal polyphosphate is Graham's salt.

15. A baking powder suitable for use in chemically leavened baking compositions having improved frozen storage qualities, said baking powder comprising a baking carbonate, an alkali metal acid pyrophosphate, a water-soluble alkali metal polyphosphate having a chain length greater than about 8, and a material which releases calcium ions when it is dissolved in water.

16. A baking powder comprising the following ingredients in approximately the indicated proportions:

| | Parts by weight |
| --- | --- |
| Sodium bicarbonate | 30 |
| Sodium acid pyrophosphate | 42 |
| Calcium hydroxide | 8–27.5 |
| Graham's salt | 0.5–20 |

17. A method for producing a stabilized chemically leavened baking composition suitable for prolonged storage at temperatures below about 30° F. which comprises incorporating into baking dough a chemical leavening composition comprising an alkali metal acid pyrophosphate, a baking carbonate, a material which releases calcium ions when it is dissolved in water, and a water-soluble alkali metal polyphosphate having a chain length greater than about 8.

18. A method for producing a stabilized chemically leavened baking composition which comprises intermixing with flour, water and shortening between about 0.7% and about 4.2% of an alkali metal acid pyrophosphate, based on the total weight of flour, between about 0.7% and 10% of a water-soluble alkali metal polyphosphate having a chain length greater than about 8, and between about 0.2% and about 3% of a water-ionizable material containing calcium as one of its ions; said percentages of polyphosphate and material containing calcium ions being based on the total weight of alkali metal acid pyrophosphate in said baking composition.

19. A method for producing a chemically leavened baking composition having improved stability upon storage in an unbaked state at low temperatures which comprises intermixing with flour, water, and shortening between about 1.4% and about 3.5% of sodium acid pyrophosphate, based on the total weight of flour, between about 2% and about 7% of sodium hexametaphosphate, and between about 0.5% and about 2% of a non-toxic calcium salt of an inorganic acid; said percentages of sodium hexametaphosphate and calcium salt being based on the total weight of sodium acid pyrophosphate in the composition.

20. The method of claim 19 wherein the sodium hexametaphosphate is replaced with Graham's salt.

21. A method for producing a chemically leavened baking composition having improved stability upon storage in an unbaked state at low temperatures, which comprises intermixing with flour, water, and shortening between about 1.4% and about 3.5% of sodium acid pyrophosphate, based on the total weight of flour, between about 2% and about 7% of sodium hexametaphosphate, and between about 0.5% and about 2% of calcium hydroxide; said percentages of sodium hexametaphosphate and calcium hydroxide being based on the total weight of sodium acid pyrophosphate in the composition.

22. The method of claim 21 wherein the sodium hexametaphosphate is replaced with Graham's salt.

References Cited in the file of this patent

UNITED STATES PATENTS

| | | |
|---|---|---|
| 2,366,857 | Hurka | Jan. 9, 1945 |
| 2,774,672 | Griffith | Dec. 18, 1956 |
| 2,870,017 | Barch | Jan. 20, 1959 |
| 2,942,988 | Erekson et al. | June 28, 1960 |